Oct. 20, 1970  E. VAN DER PYL  3,535,080
APPARATUS AND METHOD FOR THE CONTINUOUS FURNACING OF
BORIDES, CARBIDES AND SILICIDES
Filed Feb. 18, 1969
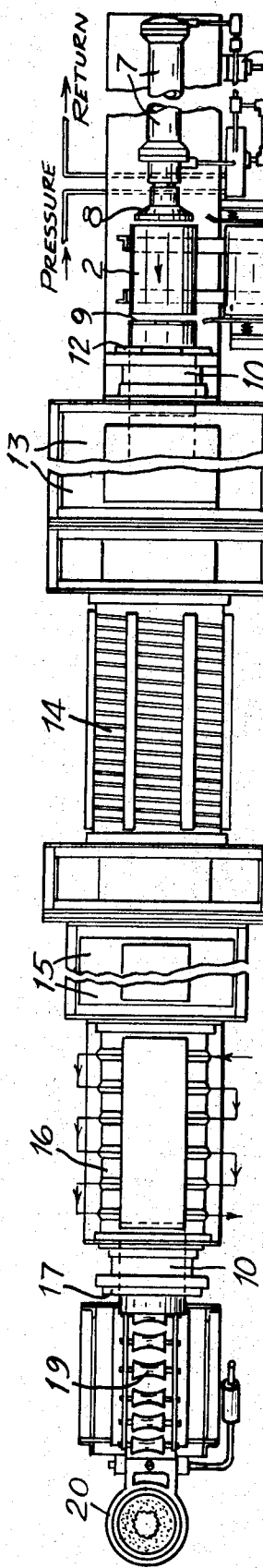
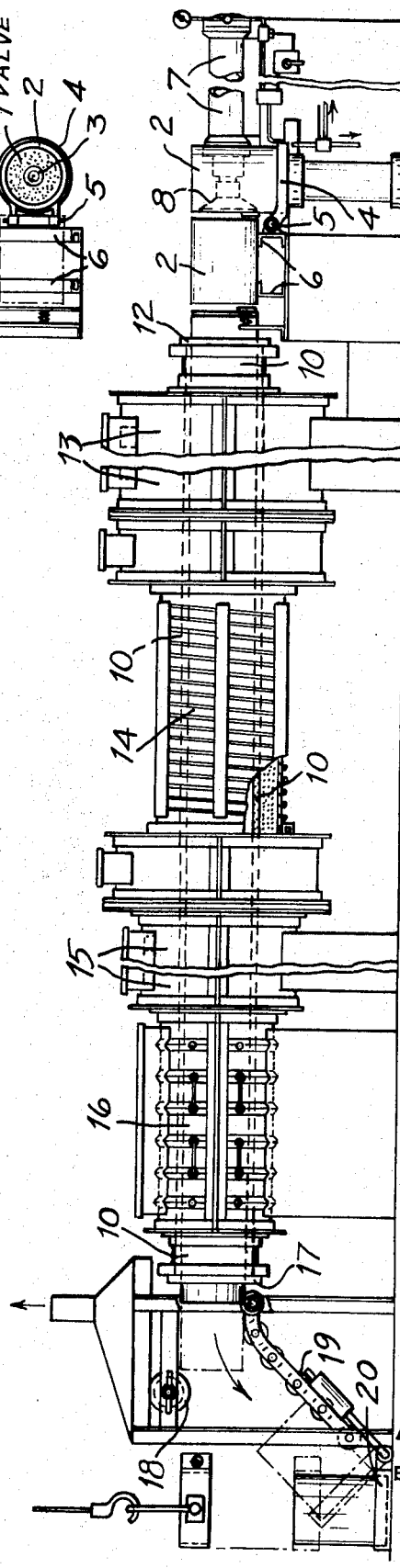
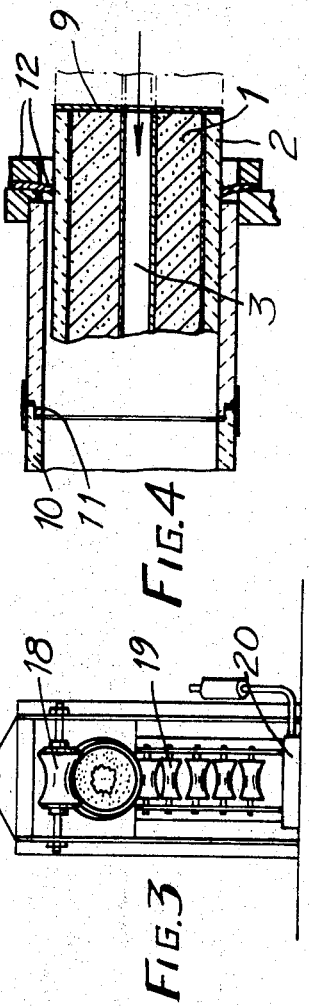
INVENTOR
EDWARD VAN DER PYL
BY
ATTORNEY United States Patent Office 3,535,080
Patented Oct. 20, 1970

3,535,080
APPARATUS AND METHOD FOR THE CONTINUOUS FURNACING OF BORIDES, CARBIDES AND SILICIDES
Edward Van der Pyl, Holden, Mass., assignor to Norton Company, Worcester, Mass., a corporation of Massachusetts
Continuation-in-part of abandoned application Ser. No. 640,077, May 22, 1967. This application Feb. 18, 1969, Ser. No. 813,365
Int. Cl. C01b 31/36; C22c 29/00; H05b 5/00
U.S. Cl. 23—204                                          12 Claims

ABSTRACT OF THE DISCLOSURE

A furnace and crucible means, and process, for continuously reacting a mix containing approximate stoichiometric proportions of carbon with (a) certain metal oxides, or (b) with metal oxides and boric acid, or (c) with metal oxides and silicon carbide; or a stoichiometric mix of certain metal oxides, silicon carbide, and boron carbide, wherein each of said crucible means has a constant transverse cross-sectional shape and a longitudinally extending thermally decomposable vent tube and is filled with such mix disposed around the vent tube, the filled crucible means being fed longitudinally through a graphite susceptor induction furnace to complete the reaction.

CROSS-REFERENCES TO RELATED APPLICATIONS

This application is a continuation-in-part of application Ser. No. 640,077, filed May 22, 1967, now abandoned.

The disclosure of Watson and Matchen in application Ser. No. 152,125 now Pat. No. 3,348,915; and, application Ser. No. 662,231, a divisional application of No. 152,125, now Pat. No. 3,429,974, are incorporated herein.

The disclosure of Matchen in application Ser. No. 342,357, now Pat. No. 3,362,787, is also incorporated herein.

BACKGROUND OF THE INVENTION

The field of the invention includes electric induction furnaces and compounds of silicon carbide, metal carbide, metal boride and metal silicide.

The properties, application and methods of manufacture for tungsten silicide, boron carbide and silicon carbide are set forth in Kirk-Othmer, "Encyclopedia of Technology," 1st edition, vol. 14, page 371, and 2nd edition, vol. 3, pp. 676 and 678, and vol. 4, pp. 114–132.

Silicon carbide is produced commercially by the reaction in an electric resistance furnace of a charge of high grade silica sand and slightly over the stoichiometric quantity of carbon in the form of coke or coal. The resistance furnace for carrying out the commercial process is built with a trough with walls of brick set into cast iron frames which are removable section by section. Heating continues for about a day and a half through a temperature of about 2600° C. at the core and at the completion of the run the power is shut off and the furnace is allowed to cool. The side walls are removed and the charge is found to consist of an outer layer of unconverted or partially converted material, an inner zone of intergrown silicon carbide crystals and a central area containing considerable graphite and voids. Although the outer layer or portions thereof may be removed and refurnaced, not all of the starting material is converted into silicon carbide.

The process and apparatus for making metallic carbides and silicides is disclosed in U.S. Pat. 2,801,156. Various processes for preparing titanium diboride are disclosed in U.S. Pats. 2,957,754, 3,013,862, and 3,041,142. The preparation of molybdenum and tungsten disilicides is disclosed in U.S. Pat. 2,619,406.

A particular advancement in the art of furnacing silicon carbide by a continuous operation is disclosed in the U.S. Pat. of Van der Pyl, U.S. Pat. 2,729,542. Van der Pyl discloses a continuous resistance or induction tube furnace and process for the synthesis of silicon carbide by charging carbon and silicon into a plurality of open ended containers and advancing the containers successively through the tube furnace at a temperature of at least 1800° C.

U.S. Pat. 2,676,234 discloses an induction furnace suitable for obtaining temperatures necessary to synthesize silicides, borides and carbides. In U.S. Pat. 3,210,455 an induction furnace is disclosed which incorporates the use of metallic or graphite susceptors for providing the necessary conductive heating for non-conductive materials. An induction tube furnace having graphite susceptors and means for controlling the atmosphere in the furnace tube is disclosed in U.S. Pat. 3,180,917, but the tube furnace is a batch and not a continuous furnace. The state of the art of induction and resistance furnaces is further set forth in Kirk-Othmer, "Encyclopedia of Chemical Technology," 2nd edition, vol. 10 (1966), pp. 261–278.

SUMMARY OF THE INVENTION

Having in mind the limitations of the prior art batch processes, it is an object of the present invention to provide a continuous process for the synthesis of borides, carbides and silicides.

Another object of the present invention is an induction tube furnace having a controlled atmosphere for the continuous synthesis of borides, carbides and silicides.

A general object of the present invention is to provide for the production of borides, carbides and silicides at a lower operating cost and with a higher yield of high quality product.

Still another general object of the invention is to avoid the unreacted feed material used as insulating material in the conventional resistance process.

A particular object of the invention is to provide a vent for the gases produces in the synthesis of carbides, borides and silicides.

Another particular object of the invention is to provide a continuous tray induction heated tube furnace having means for separating the trays after synthesis.

Upon further study of the specification, drawings and claims other objects and advantages of the present invention will become apparent.

In the present invention an apparatus and process for the continuous manufacture of borides, carbides and silicides is provided by passing a plurality of graphite cylindrical crucibles successively through an induction tube furnace having means for controlling the atmosphere therein. The crucibles are provided with an open top and open bottom or a bottom with a hole therein for the purpose of providing a blowhole as successive crucibles are passed through the tube furnace. A liner made of a thermally decomposable material is placed on the inner surfaces of the crucible and an eliminatory cylindrical tube or rod extending the length of the crucible is inserted therein to produce the blowhole. The crucibles are filled with approximately stoichiometric proportions of the reactants and the mixture of materials is tamped around the central tube. A disk made of a thermally decomposable material is then placed on the top of the crucible and successive crucibles are inserted into the tube furnace.

The tube furnace has gas seals at each end thereof cooperating with the outer diameters of the individual crucibles to control the atmosphere in the furnace tube. Although the liner, disk and cylinder in the crucible burn out during the furnacing operation, the centrally disposed cylinder provides for the removal of the gases produced by the synthesis throughout the length of the tube and the liners and disks provide for easy separation of the individual crucibles as they are removed from the tube furnace. The crucibles are advanced through the induction tube furnace at the rate of about 18 inches per hour. A temperature between about 1800° C. and 2650° C. is maintained in the tube by induction heating of the graphite tube susceptor of the furnace.

The thermally decomposable vent tubes, crucible liners, and disks are preferably fabricated of paper or cardboard because of the low cost of such material and the ready, commercial availability of a wide variety of sizes and wall thicknesses.

The tubes, liners, and disks may, however, be made of thermosetting or thermoplastic polymers, e.g. phenolformaldehyde, epoxy, unsaturated polyester, polyurethane, rubber and the like, or, polyethylene, polyamide, polypropylene, polycarbonate, polysulfone, polystyrene, polyvinyl acetate, polymethyl methacrylate, polyvinyl chloride, acrylonitrile-butadiene-styrene, and the like. The resins used may be either unfilled, or filled for the purpose of economy or to reinforce the resin. If a filled resin is used, care should be taken to avoid a filler that could interfere with the reaction to be carried out in the crucibles, or one that might act as an undesirable contaminant in the finished product. For example, if silicon carbide is to be synthesized, tubes, liners, and disks made of a silica-filled phenolformaldehyde resin would be suitable because the small amount of silica remaining after the resin has burned out would take a part in the reaction; or, the filler could be silicon carbide powder. If the filler is an organic material like wood flour, wood fibers, nylon cloth or fibers, cotton cloth or fibers, or the like, there is no problem of interference with the reaction or contamination of the final product because these materials will decompose along with the organic polymer.

In another method of practicing the invention, paper or plastic liners and disks are used, but in this case instead of packing a dry reaction mix around a decomposable center vent tube, which is to remain in place until it burns out during the synthesis process, a tube or a solid rod is placed in the lined crucible, reaction mix, dampened with 1–10% but preferably about 1–2% by weight of a temporary organic binder is firmly tamped in the crucible and around the rod, and the rod is then pulled out leaving the desired center vent or blowhole. The binder can be any of the well known so-called "temporary binders" like starch, dextrin, goulac or the like, or can be synthetic polymers like phenolformaldehyde, epoxy, polyurethane, polyester, polyvinyl alcohol or the like, or even water. The binders should be liquids at room temperature or dissolved in an appropriate solvent. In this mode of practicing the invention, room temperature curing phenolformaldehyde, epoxy, or unsaturated polyester resins are the more desirable materials because these can be formulated to cure rapidly at room temperature thereby providing a very strong, mechanically stable mix contained in the crucibles.

The prior art limitations in the manufacture of borides, carbide and silicides through batch methods are therefor obviated by the present invention and a resulting saving in the amount of by-product material produced is achieved.

BRIEF DESCRIPTION OF THE DRAWINGS

The invention is now described more in detail with reference to the drawings wherein:

FIG. 1 is a plan view of the entire furnace with the loading end at the right;

FIG. 2 is a side elevation of the apparatus shown in FIG. 1;

FIG. 3 is an end view of the discharge end of the furnace; and

FIG. 4 is a vertical longitudinal section along the inlet end of the furnace showing the graphite cloth chamber seal used on both the inlet and discharge ends of the furnace.

With particular reference to FIG. 1, the apparatus for preparing the mix and loading the furnace is shown. To produce silicon carbide or other carbides, borides or silicides the raw mix 1 is filled into a graphite crucible 2 supported on loading platform 4 that is tiltable about an axis 5 to deposite the filled crucible horizontally on rails 6. A cardboard or other decomposable tube 3 is centrally formed or positioned in the crucible and a decomposable liner is inserted inside the outer wall of the crucible while it is being filled, the liner preventing the mix from sticking to the crucible during synthesis.

After the crucible has been filled, the platform 4 on which it is supported is swung to a vertical position about the axis 5 to deposit the crucible on rails 6 leading to the inlet end of the furnace where the filled crucible is rolled into axial alignment with the hydraulic cylinder 7 to be pushed by plunger 8 into the inlet end of the furnace. A decomposable disk 9 having a central aperture therein is first interposed between the filled crucible and the last previous crucible to facilitate their separation from each other at the discharge end of the furnace.

The crucible receiving chamber of the furnace is formed of a series of aligned graphite tube sections 10 with overlapping joints 11 to compensate for linear expansion. These tubular sections form a central passageway, at each end of which there is a graphite cloth chamber seal 12 mounted on the free end of each outermost graphite tube section, such as shown in FIG. 4. Since the crucibles have to slide freely through this inner chamber, the inside diameter of this composite graphite tube is slightly greater than the outside diameter of the crucible and the sealing member 12 at each end is mounted slightly eccentric to the tube.

The composite graphite tube 10 is preferably covered in the regions of the joints by wrappings of graphite cloth covered with carbon paste. The space between the graphite tube and the outer shell of the furnace is filled with lamp black or graphite particles, and it is advantageous to provide auxiliary supports for the graphite tube in the hot cylinder. When lamp black is used as the filler material, means for venting the outside diameter of the furnace is necessary so that volatiles from the lamp black may be removed.

By actuation of the hydraulic plunger 8, the series of filled crucibles is pushed slowly through the entire length of the furnace at the rate of about 1 to 2 feet, and preferably 18 inches per hour. After passing through a preliminary heating zone 13, the filled crucibles pass through the zone of maximum heating 14 which includes an induction heater producing temperatures of from about 1800° C. to about 2650° C. The induction heater has as a susceptor the graphite tube 10 of the furnace. Temperature control is maintained by the use of an optical pyrometer sight tube, sighted on the graphite tube susceptor. The heater has induction coils of copper tubing with coolant circulating therethrough to prevent fusion of the coils.

The crucibles with their reaction product of a carbide, boride or silicide then pass through a preliminary cooling zone 15 and lastly through a final cooling zone 16 from which they emerge through another graphite cloth chamber seal 17. The seal 17 is similar in every respect to the seal 12, except that the inner margin of the graphite cloth is tilted outwardly instead of inwardly.

Since the crucibles upon leaving the furnace tend to adhere to each other, a horizontally movable roller 18 is provided to break them away from each other and to permit the severed crucibles to coast down the inclined roller skidway 19 to be received by a pivotally mounted and counterbalanced catching device 20 for depositing them on the floor.

DESCRIPTION OF THE PREFERRED EMBODIMENTS

The induction furnace used with the present invention suitably operates on 250 kw. low frequency induction power. The crucible units are preferably designed to have a 16-inch inside diameter and an outer diameter of about 19 inches. The crucibles are made of graphite tubes and these crucibles 2 are pushed through graphite tube sections 10 forming the inside furnace wall, the sections 10 having a 20-inch inside diameter and 23-inch outside diameter. The crucibles and furnace tubes are suitably produced in lengths ranging from about 20-inch and 24-inch graphite electrode stock respectively. A furnace is constructed having an overall length of about 27 feet with a central heating zone of approximately 5½ feet in length. It is contemplated however, that crucibles having an inside diameter up to 32 inches and a furnace having an inside dimension of 40 inches can be constructed capable of producing up to 1,000 tons per year.

A crucible movement averaging approximately 18 inches per hour in the 20-inch furnace is selected for the speed of operation as being optimum since higher speeds tend to destroy the equilibrium of the hot zone and lower speeds are less economical. With 2-foot long crucible units, the present apparatus requires that one unit be loaded and discharged every hour and a quarter. The crucibles are loaded in a vertical position, turned on their sides and rolled into the entering position. The high speed cylinder return and a fast forward operating valve facilitate the intermittent introduction of succeeding crucible sections into the furnace in a matter of seconds. The discharge is automatic and does not require the operator's attention until it is convenient. The use of cardboard disks between the crucibles facilitates the separation of the crucibles at the outlet end. A paper liner in the crucible prevents a reaction taking place between the mix in the crucible and its wall and facilitates removal of the product. As a result of the improvements of the invention, a longer life for the crucible and the furnace tube results.

When silicon carbide is synthesized in the apparatus of the present invention, 2.4 lbs. of mix are required to make one pound of silicon carbide and since all of the mix is reacted in the crucible there is no material for recycle. The heat loss in the apparatus is extremely low and the weight of mix plus crucible is only 2.14 lbs. per pound of product produced.

A particularly novel feature of the present invention is the establishment of a void through the center of the loaded crucible. It has been established that there is a heat and vapor flow from the periphery of the crucible toward the center and through the entire line of crucibles toward the exit end of the furnace. With the central blowhole of the present invention, the unreacted vapors from the entering crucibles have ample opportunity to pass through or over the product in the reaction zone and be absorbed. The prior art teaches that the large crystal formation takes place in so-called blowholes. In the present invention there is a continuous controlled blow with the result that larger average crystal sizes are obtained than in the prior art processes.

SILICON CARBIDE

Silicon carbide is produced continuously according to the present invention at a reaction temperature of about 1850° C. to 1950° C. The reaction is expressed in two steps in the Encyclopedia of Chemical Technology, of Kirk-Othmer, vol. 4, 2nd edition, page 127, as:

$$SiO + 2C \rightarrow Si + 2CO$$
$$Si + C \rightarrow SiC$$

The reaction is expressed in U.S. Pat. No. 949,386, as follows:

$$SiO_2 + 3C \rightarrow SiC + 2CO$$
$$3Si + 2CO \rightarrow 2SiC + SiO_2$$

The starting materials are preferably sand and coke blended in a substantially stoichiometric mixture, such as Ottawa sand and carbon, sand and petroleum carbon, or sand and coke, but may also include stoichiometric mixtures of silicon metal and carbon or silicon metal and Port Arthur Pitch coke.

BORON CARBIDE

Boron carbide is produced according to the present invention by the reduction of boric oxide by carbon at temperatures between 1400° C. and 2300° C. The reaction is accelerated by using finely divided carbon, such as carbon black, and by intimate mixing of the boric oxide and carbon. The reaction can be expressed as follows:

$$2B_2O_3 + 7C \rightarrow B_4C + 6CO$$

The carbon factor or stoichiometric ratio of carbon to the starting materials indicated by the above reaction is .375. The optimum conditions for carrying out the boron carbide reaction according to the present invention are a reaction temperature of about 1700 to 1800° C. requiring a firing temperature of 2200 to 2250° C. and a carbon factor of about 0.360.

TITANIUM DIBORIDE

The continuous production of titanium diboride is carried out according to the present invention at a temperature of about 2150° C. Titanium dioxide is reacted with boron carbide and carbon and the reaction may be expressed as follows:

$$2TiO_2 + B_4C + 3C \rightarrow 2TiB_2 + 4CO$$

MOLYBDENUM SILICIDE

Molybdenum silicide is processed continuously according to the present invention by mixing molybdenum trioxide, carbon, silicon carbide and silica or silicon and reacting the mixture at a temperature from 1700° C. to 1950° C.

TUNGSTEN SILICIDE

Tungsten silicide is also produced continuously by the present invention. According to U.S. Pat. No. 2,619,406 stoichiometric proportions of silicon metal and tungsten or molybdenum sufficient to produce the disilicide are reacted at a temperature of about 1400° C. to 1600° C. The reaction of silicon with tungsten may be expressed as follows:

$$2W + 6Si + O_2 \rightarrow 2WSi_2 + 2SiO$$

Without further elaboration, it is believed that one skilled in the art can, using the preceding description, utilize the present invention to its fullest extent. The following preferred specific embodiments are, therefore, to be construed as merely illustrative and not limitative of the remainder of the specification and claims in any way whatsoever.

EXAMPLE 1

The apparatus of the present invention was operated at a temperature of 2550° C. using graphite crucibles driven at a rate of 18 inches per hour. The crucibles have a diameter of 12 inches and are 2 feet long. The crucible was packed solidly with no center vent, with silicon metal mixed with coke shot with a small excess of carbon beyond the stoichiometric proportion necessary to produce silicon carbide. The silicon carbide coming from the end of the tube furnace had some free carbon and the crystal size of the silicon carbide produced was 76.5 microns.

EXAMPLE 2

Silicon carbide was produced as in Example 1, but with Ottawa sand and coke shot mixed in substantially stoichiometric proportions. The resulting product had a glassy phase indicating the presence of silicon. Silicon carbide crystals having an approximate size of 76 microns were produced.

EXAMPLE 3

Example 1 was repeated with silicon metal and Port Arthur Pitch coke mixed in the same proportions as Example 1. The resulting silicon carbide had free carbon present and the batch was unreacted in the zone next to the graphite crucible. The silicon carbide had a green hue and the crystal size was approximately 80 microns.

EXAMPLE 4

Example 2 was repeated, but with a 1¾-inch diameter paper vent tube inserted in the center of the crucible. Silicon carbide was produced throughout the crucible having an average crystal size of about 112 microns.

EXAMPLE 5

Example 1 was repeated with sand and coke mixed together in approximately stoichiometric proportions. A paper vent was placed in the center of the mass as in Example 4. This resulted in silicon carbide having free carbon present although the reaction took place throughout the entire crucible. The crystals produced ranged in the order of 150–160 microns.

EXAMPLE 6

Example 1 was repeated with sand and carbon (Thermax) used as the starting materials. The crucible was lined with a sheet of kraft paper and a paper vent tube was placed in the center of the crucible as in Example 4 and the mix added thereto. A kraft paper separator was placed between the successive graphite crucibles. The crucible coming from the outlet end of the tube furnace separated easily from the next crucible. The central vent space in the crucible contained some cubic silicon carbide and some silica wool. Some of the graphite of the container appeared to be reacted with the sand. The cruicible contained a green pig of silicon carbide which filled about 70% of the volume of the graphite crucible. The crystal size of the silicon carbide averaged about 110 microns with a maximum size of about 230 microns.

EXAMPLE 7

The crucibles of the present invention were loaded with a mixture of 24 mesh and finer boric oxide and 325 mesh and finer lamp black in a weight ratio or carbon factor of 0.361 carbon to the weight of total boric oxide and lamp black. The apparatus of the present invention was operated at a temperature sufficient to produce a temperature of 1900° C. in the graphite crucible. The mix was added to the crucibles and packed around a central paper vent tube. A kraft paper separator was placed between successive graphite crucibles and the crucibles were driven through the tube furnace at a rate of 18 inches per hour. The crucibles exiting from the end of the tube furnace contained crystals of boron carbide.

EXAMPLE 8

Titanium diboride was produced by the apparatus of the present invention by mixing approximately stoichiometric proportions of titanium dioxide, boron carbide and carbon sufficient to produce titanium diboride. The mixture was added to the graphite crucible of the present invention with a paper tube in the center of the crucible. After tamping the mixture into place, a kraft paper separator was placed between successive crucibles and the crucibles were inserted into the tube furnace. The tube furnace was operated at a temperature sufficient to produce a temperature in the crucible of 2150° C. and the crucibles were advanced through the oven at a rate of about 18 inches per hour. The crucibles exiting from the end of the tube furnace were found to contain titanium diboride crystals.

EXAMPLE 9

Molybdenum disilicide was produced with the apparatus of the present invention by mixing 65 to 75 parts by weight of molybdenum oxide, 15 to 25 parts by weight silicon carbide, 7 to 20 parts by weight carbon and 15 to 20 parts by weight silicon and placing the materials in the crucibles of the present invention. The mixture was tamped around a central paper vent tube. The tube furnace was operated at a temperature sufficient to produce a reaction temperature in the crucibles of 1700° C. to 1950° C. Kraft paper separators were placed on the tops of the crucibles and they were advanced successively through the tube furnace at a rate of about 18 inches per hour. The crucibles exiting from the end of the tube furnace contained crystals of molybdenum disilicide.

EXAMPLE 10

Molybdenum silicide was produce according to the present invention from a mixture of 65 to 75 parts of weight molybdenum oxide, 15 to 25 parts by weight silicon carbide and 7 to 20 parts by weight carbon. The mixture was placed in a paper lined crucible having a central paper vent tube and tamped around the tube. The tube furnace was operated at a temperature sufficient to produce a temperature of 1700° C. to 1950° C. in the crucibles and the crucibles were passed successively through the tube furnace at a rate of 18 inches per hour. Kraft paper disks were inserted between successive tubes and the lining of the crucibles was kraft paper. The crucibles exiting from the end of the tube furnace contained molybdenum silicide.

EXAMPLE 11

Tungsten disilicide was produced with the apparatus of the present invention, from a mixture of tungsten and silicon. Stoichiometric proportions of tungsten and silicon sufficient to produce tungsten disilicide were added to the graphite crucibles of the present invention and tamped around a central paper vent tube. Successive crucibles were added to the tube furnace with kraft paper separators between the crucibles. The crucibles were advanced through the tube furnace operating at a temperature sufficient to produce a reaction temperature of 1400° C. to 1600° C. in the crucibles. The crucibles exiting from the end onf the tube furnace contained crystals of tungsten disilicide.

EXAMPLE 12

The silicon carbide produce of Example 6 is made by using a vent tube, crucible liner, and crucible separator made of polyethylene.

EXAMPLE 13

The silicon carbide product of Example 6 is made by using a vent tube and crucible separator made of a 98% by weight wood flour filled phenol-formaldehyde condensation resin; the crucible liner is provided by precoating the inside of the crucible with a liquid phenol-formaldehyde resin catalyzed to cure at room temperature with p-toluene sulfonic acid.

EXAMPLE 14

Molybdenum silicide is prepared according to Example 10 except that a vent tube and crucible separator fabricated of a 98% by weight silicon carbide filled epoxy resin is used; the crucible liner is provided by coating the inside of the crucible with a room temperature curing liquid epoxy resin and allowing it to cure at least to a non-tacky condition prior to filling the crucible with reaction mix.

EXAMPLE 15

The silicon carbide of Example 6 is prepared using a vent tube, crucible liner, and crucible separator made of polyurethane resin.

EXAMPLE 16

Titanium diboride is produced according to Example 8 using a vent tube and crucible separator made of unfilled polystyrene.

EXAMPLE 17

Molybdenum silicide is produced according to Example 9 using a vent tube and crucible separator made of polycarbonate resin.

EXAMPLE 18

$WSi_2$ is produced according to Example 11, but instead of using a paper tube to form the blowhole, the reaction mix of tungsten and silicon is uniformly dampened with about 2% by weight of a room temperature curing liquid epoxy resin. The mixture is then tamped in the crucible and around a solid rod 1¾" in diameter and the rod is then slipped out of the compacted mixture thereby providing the continuous blowhole of the invention. The filled crucibles are then allowed to stand for 1-2 hours to allow the epoxy resin system to at least partially cure. The crucibles are then loaded into the furnace using kraft paper separators.

The preceding examples can be repeated with similar success by substituting the generically and specifically described reactants and operating conditions of this invention for those used in the preceding examples.

From the foregoing description one skilled in the art can easily ascertain the essential characteristics of this invention and without departing from the spirit and scope thereof, can make various changes and modifications in the invention to adapt it to various usages and conditions. Consequently, such changes and modifications are properly, equitably, and intended to be within the full range of equivalence of the following claims.

What is claimed is:
1. In the process for synthesizing carbides, borides, and silicides by charging a reaction mixture into a plurality of open ended containers which are of a size and shape to be detachably joined at their open ends, mating a plurality of said containers open end to open end and introducing them into a furnace having the shape of a long tube thereby forming a reaction tube within the tube furnace which reaction tube thereby formed constitutes a single compartment, advancing the containers serially through the tube furnace and removing the containers which have been advanced all the way through the tube furnace and heating said tube to a temperature of at least 1800° C., the improvement comprising:
   (a) lining said open ended containers with a thermally decomposable liner;
   (b) packing said reaction mixture in each of said open ended containers and forming therein a centrally located void extending lengthwise through each of said containers by incorporation of a thermally decomposable means;
   (c) placing thermally decomposable covers over the open ends of the containers; and
   (d) sealing the space between the outside surfaces of the open ended containers and the inside of the furnace tube at each end of the furnace tube.

2. The process of claim 1 wherein said reaction mixture is packed around a centrally located thermally decomposable vent tube.

3. The process of claim 2 wherein said liners, vent tubes, and end covers are made of paper or cardboard.

4. The process of claim 2 wherein said liners, vent tubes, and end covers are made of an unfilled organic polymer.

5. The process of claim 2 wherein said liners, vent tubes, and end covers are made of an organic polymer containing up to 98% by weight of organic filler.

6. The process of claim 3 wherein said open ended containers are graphite crucibles.

7. The process of claim 2 wherein said reaction mixture is selected from the group consisting of mixtures of carbon and silicon dioxide; carbon and metal oxides; carbon, metal oxides and boric acid; metal oxides, metal carbides, and boron carbides; and metal oxides, silicon carbide and carbon.

8. The method of claim 2 wherein the process is operated at a temperature between about 1800° C. and 2650° C.

9. The combination of claim 6 wherein said furnace has sealing means at the inlet and outlet ends for confining the atmosphere within the furnace.

10. The combination of claim 9 wherein said sealing means for confining the atmosphere within the furnace are fabric seals impregnated with carbon located at said furnace inlet and outlet ends cooperating with said cylindrical graphite crucibles.

11. The combination of claim 6 including a roller at said outlet of the furnace adapted to contact said crucibles.

12. The combination of claim 6 wherein said electric furnace is an induction heating furnace and said central tube is a graphite susceptor tube operable at a temperature of between about 1800° C. and 2650° C.

References Cited

UNITED STATES PATENTS 2,729,542  1/1956  Van der Pyl.
3,249,401  5/1966  Wood et al. _____ 23—204

FOREIGN PATENTS 761,311  11/1956  Great Britain.

E. C. THOMAS, Primary Examiner

HOKE S. MILLER, Assistant Examiner

U.S. Cl. X.R.

13—26; 23—208, 277